(12) United States Patent
Van Wiemeersch et al.

(10) Patent No.: US 9,124,124 B2
(45) Date of Patent: Sep. 1, 2015

(54) SYSTEM AND METHOD FOR REDUCING INTERFERENCE DURING WIRELESS CHARGING

(71) Applicant: Ford Global Technologies, LLC, Dearborn, MI (US)

(72) Inventors: John Robert Van Wiemeersch, Novi, MI (US); Michael Hrecznyj, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 359 days.

(21) Appl. No.: 13/652,983

(22) Filed: Oct. 16, 2012

(65) Prior Publication Data

US 2014/0103865 A1     Apr. 17, 2014

(51) Int. Cl.
| | | |
|---|---|---|
| H02J 7/00 | (2006.01) | |
| H02J 7/02 | (2006.01) | |
| H04B 5/00 | (2006.01) | |
| H02J 17/00 | (2006.01) | |

(52) U.S. Cl.
CPC .............. *H02J 7/025* (2013.01); *H02J 7/0047* (2013.01); *H02J 17/00* (2013.01); *H04B 5/0031* (2013.01); *H04B 5/0037* (2013.01); *H02J 2007/005* (2013.01)

(58) Field of Classification Search
CPC ........................... H04B 5/0037; H04B 5/0031
USPC ......................................................... 320/108
See application file for complete search history.

(56) References Cited

U.S. PATENT DOCUMENTS

| | | |
|---|---|---|
| 3,938,018 A | 2/1976 | Dahl |
| 5,952,814 A | 9/1999 | Van Lerberghe |
| 6,075,340 A | 6/2000 | Koenck |
| 6,419,379 B1 | 7/2002 | Hulse |
| 7,434,953 B2 | 10/2008 | Newton et al. |
| 7,518,337 B2 | 4/2009 | Beart et al. |
| 7,633,263 B2 | 12/2009 | Toya |
| 7,772,802 B2 | 8/2010 | Manico et al. |
| 7,808,205 B2 | 10/2010 | Rao et al. |
| 7,889,498 B2 | 2/2011 | Diebel et al. |
| 7,932,638 B2 | 4/2011 | Randall |
| 7,952,322 B2 | 5/2011 | Partovi et al. |
| 8,102,147 B2 | 1/2012 | Jung |
| 8,103,266 B2 | 1/2012 | Fok et al. |
| 8,120,311 B2 | 2/2012 | Baarman et al. |
| 8,169,185 B2 | 5/2012 | Partovi et al. |
| 8,242,741 B2 | 8/2012 | Phelps, III |

(Continued)

OTHER PUBLICATIONS

"Wireless Power Receiver IC Complements Existing Transmitter," Power Electronics Technology, www.powerelectronics.com, Jul. 2011, pp. 15-17.

(Continued)

*Primary Examiner* — M'Baye Diao
(74) *Attorney, Agent, or Firm* — Vichit Chea; Price Heneveld LLP

(57) ABSTRACT

A method is provided for reducing interference in an inductive charging system within a vehicle. The method includes inductively charging a device with an inductive charger. The method also includes detecting at least one mode of operation of a potential interfering device in proximity to the inductive charger. The method further includes adjusting at least one of a frequency band employed by the charger and an amount of power provided to the device by the charger based on at least one detected mode of operation.

17 Claims, 7 Drawing Sheets

(56) References Cited

U.S. PATENT DOCUMENTS

| | | |
|---|---|---|
| 8,373,310 B2 | 2/2013 | Baarman et al. |
| 8,410,751 B2 | 4/2013 | Terao et al. |
| 8,421,278 B2 | 4/2013 | Yamamoto et al. |
| 8,645,481 B2 * | 2/2014 | Eaton .............................. 709/206 |
| 8,903,456 B2 * | 12/2014 | Chu et al. ....................... 455/567 |
| 2003/0019931 A1 * | 1/2003 | Tsikos et al. ................... 235/454 |
| 2005/0127867 A1 * | 6/2005 | Calhoon et al. ................ 320/108 |
| 2005/0131486 A1 | 6/2005 | Boveja et al. |
| 2007/0293277 A1 | 12/2007 | Bury |
| 2009/0051312 A1 | 2/2009 | Simon et al. |
| 2009/0146608 A1 | 6/2009 | Lee |
| 2010/0114241 A1 * | 5/2010 | Donofrio et al. ................ 607/59 |
| 2010/0181961 A1 * | 7/2010 | Novak et al. ................... 320/108 |
| 2010/0207575 A1 * | 8/2010 | Pijnenburg et al. ............ 320/108 |
| 2010/0253281 A1 | 10/2010 | Li |
| 2010/0289448 A1 | 11/2010 | Jung et al. |
| 2011/0018679 A1 | 1/2011 | Davis et al. |
| 2011/0050164 A1 | 3/2011 | Partovi et al. |
| 2011/0291613 A1 | 12/2011 | Rosik et al. |
| 2012/0104997 A1 | 5/2012 | Carobolante |
| 2012/0117730 A1 | 5/2012 | Lemire et al. |
| 2012/0206098 A1 * | 8/2012 | Kim .............................. 320/108 |
| 2012/0235636 A1 | 9/2012 | Partovi |
| 2012/0299538 A1 * | 11/2012 | Arai et al. ...................... 320/108 |
| 2013/0020988 A1 * | 1/2013 | Kim et al. ...................... 320/108 |
| 2013/0049662 A1 | 2/2013 | Keong et al. |
| 2013/0076308 A1 | 3/2013 | Niskala et al. |
| 2013/0093390 A1 | 4/2013 | Partovi |
| 2013/0096651 A1 | 4/2013 | Ozawa et al. |
| 2013/0113421 A1 | 5/2013 | Han et al. |
| 2013/0147426 A1 | 6/2013 | Misono |
| 2013/0257363 A1 | 10/2013 | Lota et al. |
| 2013/0300204 A1 | 11/2013 | Partovi |
| 2014/0125277 A1 | 5/2014 | Van Wiemeersch et al. |
| 2014/0129054 A1 | 5/2014 | Huntzicker et al. |
| 2014/0176057 A1 | 6/2014 | Van Wiemeersch |
| 2014/0191568 A1 | 7/2014 | Partovi |
| 2014/0203770 A1 | 7/2014 | Salter et al. |
| 2014/0217965 A1 | 8/2014 | Van Wiemeersch et al. |
| 2014/0239891 A1 | 8/2014 | Martin et al. |

OTHER PUBLICATIONS

"Qi Compliant Wireless Power Transmitter Manager," Texas Instruments Incorporated, www.ti.com, document bq500210, Jun. 2011, Revised Aug. 2011, 25 pages.

Ngo, Dong, "CES: Universal Wireless Charging ElectroHub to Demo at CES 2011," www.cnet.com/8301-32254_1-20024327-283.html, Dec. 1, 2010, 7 pages.

* cited by examiner

| | VEHICLE OPERATION MODE | PROTOCOL | | |
|---|---|---|---|---|
| | | PROTOCOL 1 | PROTOCOL 2 | PROTOCOL 3 |
| 0 | NO FACTORY EQUIPPED VEHICLE ACCESS & START SYSTEM | FULL LF BAND | FULL LF BAND | FULL LF BAND |
| 1 | VEHICLE OFF, AM/FM BAND OFF, NO VEHICLE ACCESS & START SYSTEM ACTIVATED | FULL LF BAND | FULL LF BAND | FULL LF BAND |
| 2 | AM ACTIVATE AT TUNER FREQUENCIES ≥ P kHz NO VEHICLE ACCESS & START SYSTEM ACTIVATED | FULL LF BAND | FULL LF BAND | SET INDUCTIVE CHARGING PAD (TUNER /4) |
| 3 | AM ACTIVE AT TUNER FREQUENCIES < P kHz NO VEHICLE ACCESS & START SYSTEM ACTIVATED | SET INDUCTIVE CHARGING PAD (TUNER FREQ/4) | SET INDUCTIVE CHARGING PAD (TUNER FREQ/4) | SET INDUCTIVE CHARGING PAD (TUNER FREQ /2) |
| 4 | ALTERNATIVE ACTIVE VEHICLE ACCESS & START SYSTEM START/RUN QUERY (START, ENTRY, OR KEY STATUS CHECK) | EXCLUDE A – B kHz BAND FOR LF CHARGING | EXCLUDE A – B kHz BAND FOR LF CHARGING | FULL LF BAND |
| 5 | VEHICLE ACCESS & START SYSTEM KEY FOB LOCATION TRIANGULATED | EXCLUDE A – B kHz BAND FOR LF CHARGING | EXCLUDE A – B kHz BAND FOR LF CHARGING | FULL LF BAND |
| 6 | PHONE MISS-ALIGNED ON INDUCTIVE CHARGING PAD (OPTION TO REDUCE POWER) | HOLD LF BAND SETTING, REDUCED POWER Z% | HOLD LF BAND SETTING, REDUCED POWER Z% | HOLD LF BAND SETTING, REDUCED POWER Z% |
| 7 | 1st ATTEMPT ACTIVE VEHICLE ACCESS & START SYSTEM START/RUN QUERY (START, ENTRY, OR KEY STATUS CHECKS QUERY) | HOLD LF BAND SETTING, REDUCED POWER C% FOR T SECONDS | HOLD LF BAND SETTING, REDUCED POWER C% FOR T SECONDS | FULL LF BAND |
| 8 | SECOND ATTEMPT OF VEHICLE ACCESS & START SYSTEM START/RUN QUERY IF KEY NOT FOUND (START, ENTRY, OR KEY STATUS CHECKS) | SUSPEND CHARGING FOR T SECOND | SUSPEND CHARGING FOR T SECOND | FULL LF BAND |
| 9 | 911 ASSIST CALL TO BE INITIATED | SUSPEND CHARGING IF PHONE SOC > X% | | |
| 10 | 911 ASSIST CALL IN-PROGRESS | SUSPEND CHARGING FOR DURATION OF 911 CALL UNLESS PHONE SOC DROPS BELOW X% THEN RE-INITIATE CHARGING | | |

FIG. 6

SYSTEM AND METHOD FOR REDUCING INTERFERENCE DURING WIRELESS CHARGING

FIELD OF THE INVENTION

The present invention generally relates to wireless charging systems, and more particularly relates to reducing interference during wireless charging of portable devices in a vehicle.

BACKGROUND OF THE INVENTION

Portable battery operated electronic devices, such as cell phones, employ rechargeable batteries that must be recharged when battery charge is consumed. Typically, electric-powered or electronic devices are physically connected to an electrical charger via a wire connection. More recently, wireless charging devices such as inductive chargers are available to charge the battery without any physical wire connection between the electronic device and the charging device. Wireless chargers generate an electromagnetic field through the use of electromagnetic transducers to transfer the electric energy from the charging device to a receiver on a battery or device having a battery being charged. Inductive chargers generate a magnetic field through the use of inductive coils to transfer the electric energy from the charging device to a receiver on a battery or device having a battery being charged. Inductive chargers have been proposed for use on vehicles in various locations having a portable battery or a battery operated device within the cockpit of the vehicle, typically near the driver and other passengers, for the sake of convenience to allow easy access to the devices. However, the electromagnetic field may potentially emit energy producing frequency interference with other systems in the vehicle or brought to the vehicle. It is therefore desirable to provide a wireless charger within a vehicle in a manner that minimizes the introduction of frequency interference with other systems used in the vehicle.

SUMMARY OF THE INVENTION

According to one aspect of the present invention, a method for reducing interference from an inductive powering system is provided. The method includes inductively charging a chargeable device with an inductive charger. The method also includes detecting a mode of operation of a potential interfering device in proximity to the inductive charger. The method further includes adjusting at least one of a frequency band employed by the charger and an amount of power provided to the device by the charger based on the detected mode of operation.

According to another aspect of the present invention, a charging system for reducing interference during inductive charging of a portable device is provided. The system includes an inductively powered charger and a controller. The controller detects a mode of operation of a potential interfering device in proximity to the charger and adjusts at least one of a frequency band employed by the charger and an amount of power provided to the portable receiving device by the charger based on the detected mode of operation.

According to a further aspect of the present invention, an in-vehicle wireless charging system for reducing interferences during inductive charging of portable devices is provided. The charging system includes a charger region provided in a vehicle, an inductively powered charger and a controller in communication with the inductive charger. The controller detects a mode of operation of a potential interfering device in proximity to the inductive charger and adjusts at least one of a frequency band employed by the charger and an amount of power provided to the portable device by the charger based on the detected mode of operation.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 6 is a table illustrating operations implemented by the wireless charging system based upon inductive charging protocol and operation mode, according to one embodiment.

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
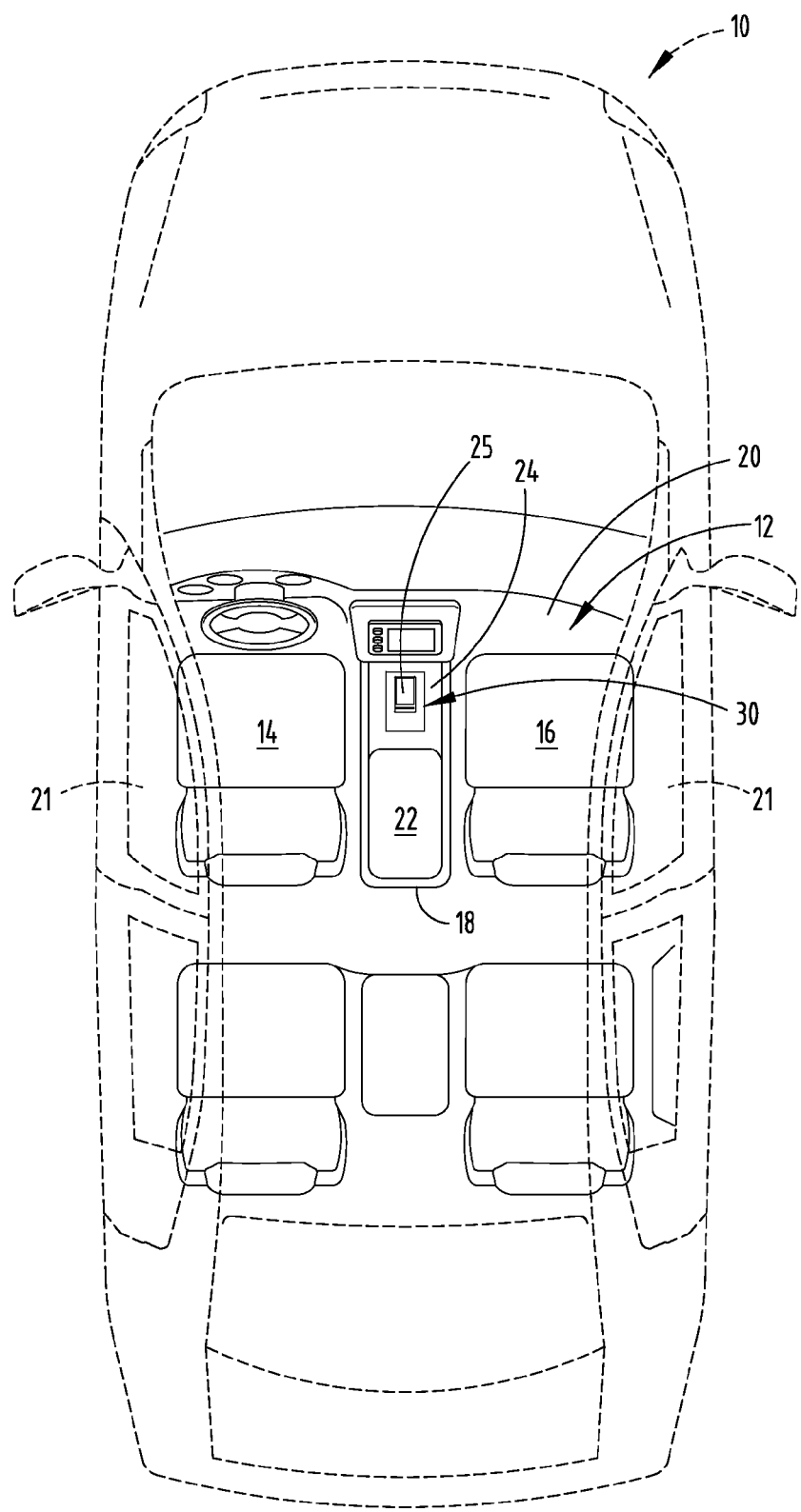
FIG. 1 is a perspective view of a cockpit of a vehicle employing a wireless charger at a potential charging region, according to one embodiment.
Figure 2:
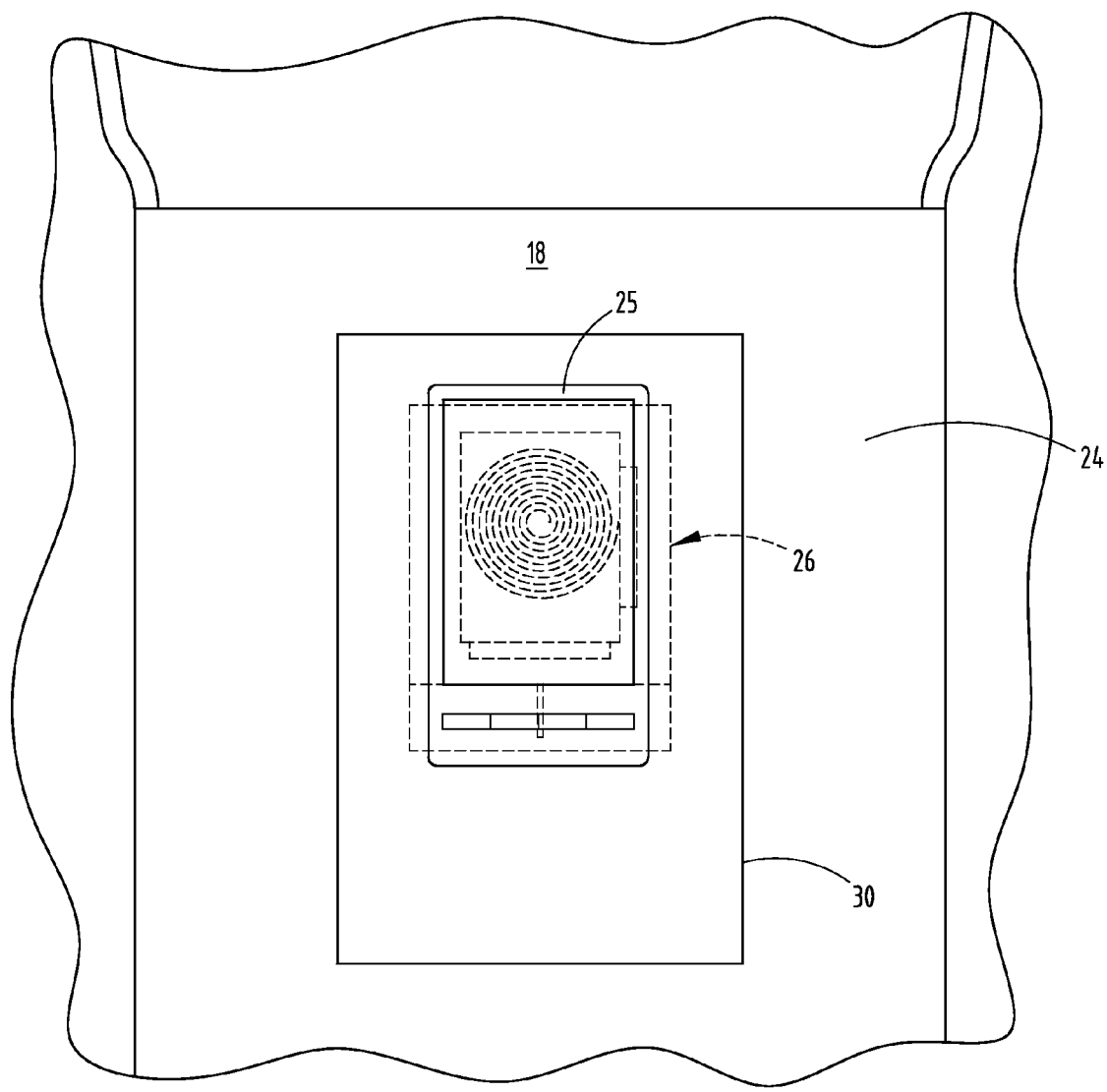
FIG. 2 is an enlarged top view of a portion of the vehicle cockpit further illustrating the charging region located on a center console of a vehicle with a portable chargeable device in proximity to the charger.

Referring to FIGS. 1 and 2, the interior of an automotive vehicle 10 is generally illustrated having a passenger compartment 12 employing a wireless inductive charging system 30, according to one embodiment of the present invention. The vehicle 10 generally includes a seating arrangement including a front driver seat 14 and front passenger seat 16, each adapted to seat a person as an occupant in passenger compartment 12 of the vehicle 10. The vehicle 10 also includes a center console 18 with storage compartment 22 disposed between front seats 14 and 16, and side door armrests 21. The center console 18, dashboard 20, and armrests 21, as well as other vehicle assemblies, may be equipped with various device holders such as trays and storage compartments that may receive one or more devices for wireless charging. The vehicle 10 may further include rear seating and wireless charging trays and storage compartments configured for wireless inductive charging located in the rear seating area.

FIG. 2 illustrates an enlarged view of a portion of the interior of the automotive vehicle 10 containing an inductive charging system 30. In the embodiment shown, a charging region 24 may be located on the center console 18 of the vehicle 10 and a portable chargeable device 25 may be placed on the surface of the charging system 30. The vehicle 10 may be equipped with one or more wireless charging systems 30 for wirelessly charging one or more devices, including one or more rechargeable batteries providing electrical power within an electronic device. In one embodiment, one or more wireless charging systems 30 may be provided in one or more storage trays or dedicated trays provided in center console 18. The wireless charging system 30 includes a wireless inductive charger 26, such as inductive charger according to one embodiment. Inductive chargers typically include one or more inductive coils for generating electric signals in the form of an electromagnetic field (EMF) typically at low frequencies within a charging region 24. In the embodiment shown, the charging region 24 may be defined by a tray or a storage compartment having a bottom wall and side walls for receiving a device, such that the device when located within the charging region 24 may be charged via the electromagnetic field through inductive coupling. According to another embodiment, the wireless charging system 30 may use a charging region 24 provided on one or more pads or trays provided in the vehicle dashboard 20. According to a further embodiment, the wireless charging system 30 may use a charging region 24 provided with an inductive charger 26 located in a tray within the armrest 21 extending from a vehicle door. In each of these embodiments, the wireless charging system 30 has a charging region 24 adapted to receive one or more devices, such as rechargeable batteries or electric powered or electronic devices 25 employing rechargeable batteries that may be charged via an electric signal on the charging region and may be accessible to the driver or other passengers within the cockpit 12 of vehicle 10. Examples of electronic devices 25 that may be charged by the charging system 30 include cell phones, computers, radios, lighting devices, and music and video players.

Figure 3:
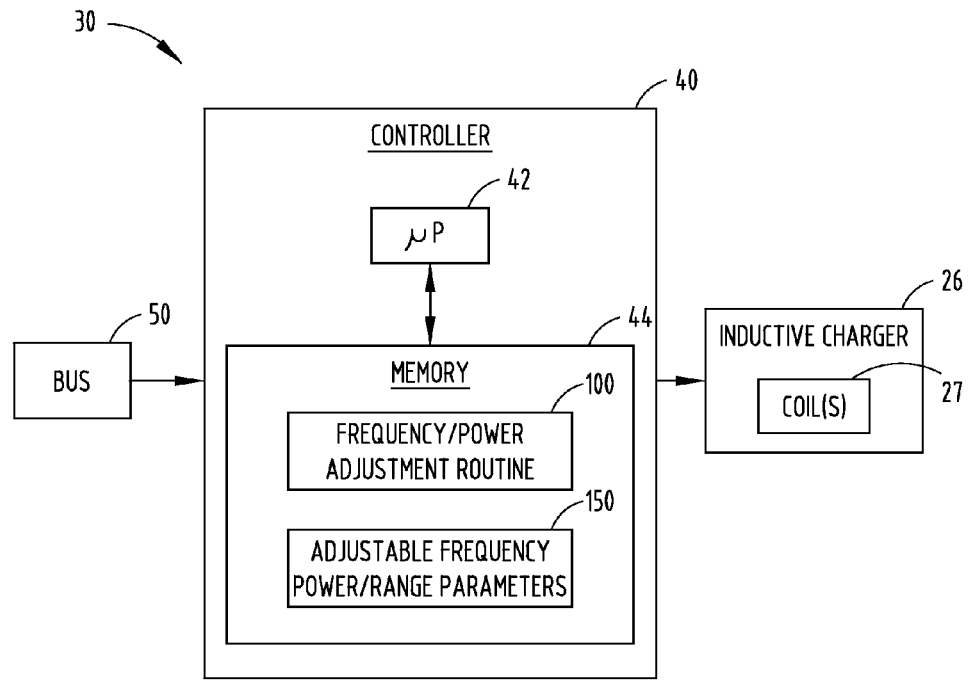
FIG. 3 is a block diagram of an inductive charging system, according to one embodiment.

Referring to FIG. 3, the wireless charging system 30 is further illustrated having control circuitry shown in one embodiment as a controller 40 including a microprocessor 42 and memory 44. The controller 40 may include other or additional analog and/or digital circuitry. Stored within memory 44 may be a frequency/power adjustment routine 100 and adjustable frequency range and power charging parameters 150. The controller 40 may receive as inputs: 1) a signal indicative of the current charger state 30 e.g. on or off; and 2) information via a network bus 50 relating to at least one of a detected interfering operation mode of vehicle systems in proximity to wireless charging system 30. The vehicle operation mode information may include frequency band of a vehicle system, status information for a vehicle system such as active/inactive or in progress/to be initiated and positional information of a system in the vehicle relative to controller 40. Detection of such modes of operation may indicate that a device operating in such a mode would create a frequency that would cause potential interference with vehicle systems in its proximity. The interference can be in the form of radiated emissions and/or conducted emissions. Such interference between vehicle devices and charger 30 may cause failure of the vehicle device or charger 30 to operate effectively as well as the potential for a device under charge to overheat by being overexposed to a particular frequency of the charger 30. Following detection of a potential inferring mode of operation, the controller 40 may process this input information with respect to the protective frequency/power adjustment routine 100 and generate an output to the inductive charger 26 having inductive coil(s) 27 so as to at least reduce or prohibit the electrical charging signal to be generated by the charger 26 and/or adjust the frequency within the charging region in order to avoid potential frequency interference with other vehicle modules.

Figure 4:
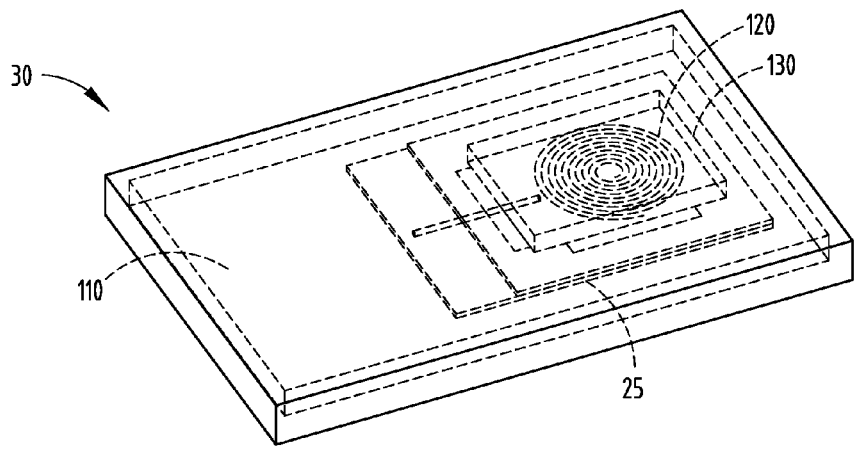
FIG. 4 is a perspective view of an inductive charging system, according to one embodiment.

FIG. 4 illustrates a possible implementation of wireless inductive charging system 30 according to some embodiments of the present invention. In FIG. 4, a transmitter section 110 may be housed in charging system 30. The transmitter section 110 may contain one or more transmitter coils (not shown) which may be coupled to a connector that is plugged into a standard external power source. A receiver 130 may be housed in chargeable electronic device 25. The transmitter section 110 may provide power to the receiver 130 such that the receiver 130 provides power to a rechargeable battery and the transmitter section 110 may receive additional control information from receiver 130 to adapt to a particular power transfer based on the control information.

The vehicle charging system 30 may include one or more wireless chargers for generating electric charging signals in a charger region 24 to charge electronic device 25 containing a rechargeable battery. The wireless charger may include an inductive charger 26 generating an electromagnetic field. The inductive charger may include one or more inductive coils 27 located below or on the bottom surface of the charger region 24 such as a pad for generating an electromagnetic field in the charger region 24. The electromagnetic field passes from inductive coils 27 into the charger region 24 and is intended to wirelessly couple to one or more inductive receiver coils 120 provided in the portable electronic device 25 so as to transfer electrical energy thereto for purposes of charging one or more rechargeable batteries. As a result, an electromagnetic field is present within the charger region 24.

Figure 5:
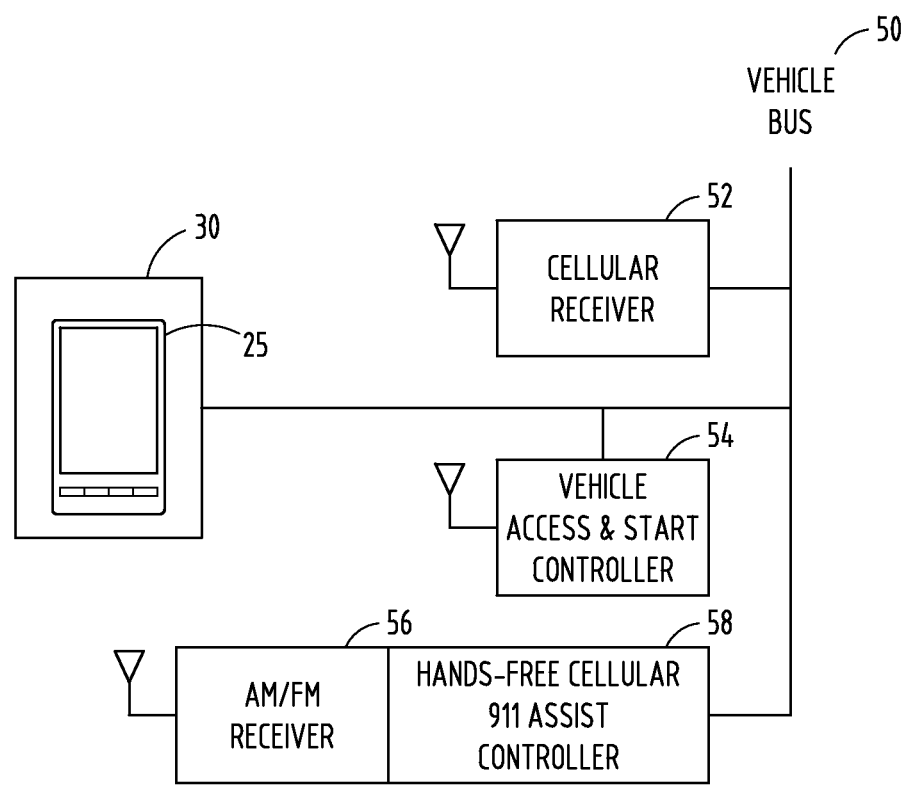
FIG. 5 is a schematic block diagram of a wireless charging system configured to reduce interference between the inductive charging system and other systems in a vehicle, according to one embodiment.

FIG. 5 shows a schematic illustration depicting one embodiment of an adaptable wireless communication system including a network connection between wireless charging system 30 and a vehicle access and start system including a plurality of additional features integrated in the vehicle. Charging system 30 may interface with a plurality of networks via a vehicle bus 50 such as a privately accessible network such as WAN/LAN, publicly accessible networks such as the Internet, in-vehicle networks such as Controller Area Networks (CAN) and Assembly Line Data Link (ALDL). When the charging system 30 is connected to an in-vehicle data bus 50, the controller 40 in wireless system 30 may accept in-coming operation mode information from other vehicle devices connected to the in-vehicle data network such as frequency band information, status information such as active/inactive and indication of progress/initialization, and positional information of a device relative to system 30. In addition, when connected to an in-vehicle data network, the controller 40 may monitor the in-coming operation mode information from other vehicle electronic devices and systems connected to the network as well as operating frequency of system 30. Depending on the operation mode detected by the controller 40, the controller 40 may issue commands modifying the operating frequency band of charger 26 and/or the amount of power used by charger 26 to charge the rechargeable battery or batteries of the portable device 25 by adjusting the electrical charging signal generated by charger 26.

As shown in one embodiment in FIG. 5, an in-vehicle data bus 50 allows for communication between wireless charging system 30 and various components integrated within vehicle 10 such as a cellular receiver 52, a vehicle access and start controller 54, an AM/FM receiver 56, and a hands-free cellular 911 assist controller 58. Controller 40 within wireless charging system 30 may be instructed to charge wireless device 25 at a particular frequency band depending on the type of inductive charging protocol that device 25 responds to. Some examples of inductive charging protocols that charging system 30 may be equipped with are: Qi Wireless Power Consortium (WPC) which may operate on a low frequency band of 90 kHz-205 kHz, Powermat Generation 2 which may also operate on a low frequency band of 90 kHz-205 kHz, and Powermat Generation 1 which may operate on a low frequency band of 270 kHz-370 kHz. Other inductive charging protocols and other operating frequencies may be employed.

A cellular receiver 52 may be contained within a cellular device that is equipped inside vehicle 10. The receiver 52 may also allow the user to receive phone calls from any remote phone and transmit phone calls from integrated vehicle 10 by operating at a frequency of 850 MHz to 1900 MHz depending on the type of mobile standard (such as GSM or CDMA) on which the cellular device operates. Cellular receiver 52 may broadcast a message to charging system 30 over vehicle bus 50 indicating that the vehicle cellular device is receiving and transmitting data and may be susceptible to a potential interfering frequency from the operating band of the inductive charger system 30. Alternatively, the operating frequency of the cellular receiver 52 may be measured by a vehicle access and start controller 54 and the vehicle access and start controller 54 may broadcast a message over vehicle bus 50 to charging system 30 indicating the cellular device is operating at a frequency that may be susceptible to potential interference from the operating frequency of inductive charger 30.

An AM/FM receiver 56 may be contained within a vehicle radio (not shown) that is equipped inside vehicle 10. The AM/FM receivers may support North American FM bands operating at a frequency of 88 MHz to 108 MHz and North American AM bands operating at a frequency of 520 kHz to 1610 kHz as well as other worldwide audio bands such as long wave and NOAA weather band. AM/FM receiver 56 may broadcast a message to charging system 30 over vehicle bus 50 indicating the vehicle radio is tuned to a station with a frequency band that would potentially see interference from the operating frequency of charging system 30. Alternatively, the operating frequency of the AM/FM receiver 56 may be measured by a vehicle access and start controller 54 if the vehicle access and start controller 54 determines the operating frequency reaches a certain threshold, it will broadcast a message over vehicle bus 50 to charging system 30 indicating the receiver 56 is operating at a frequency that potentially may see interference from the operating frequency of inductive charger 30.

A 911 assist controller 58 contained within a 911 Hands-Free Cellular Assist System (not shown) may be equipped inside vehicle 10. The 911 Hands-Free Cellular Assist System may synchronize with a driver's cellular device allowing for hands-free cellular phone capabilities while driving and also connecting the driver directly to a local 911 operator in the event an accident is detected within the vehicle (for example, vehicle airbags deploy or emergency fuel pump shutoff is activated). This feature may deliver a voice message to operators indicating vehicle has been in an accident. If an accident occurs while the driver is using the hands-free phone capabilities, the 911 Assist System would automatically end that call and dial 911. If an occupant of the vehicle is unable to communicate with the 911 operator, a message sent by the Assist System tells the 911 operator that an accident has occurred and location information provided by the mobile phone carrier is given to the operator. If a 911 Assist Call is either in progress or about to be initiated, the 911 assist controller 58 may broadcast a message to inductive charging system 30 over vehicle bus 50 indicating charging of a mobile device 25 to be suspended in order to reduce the probability that inductive charger 30 will interfere with the 911 Assist Call. An example of a 911 Hands-Free Cellular Assist System is Ford Motor Company's SYNC® 911 Assist feature, which may be equipped onto Ford's vehicles.

Once the controller 40 receives from the network bus 50 status messages from vehicle modules such as the cellular receiver 52, vehicle access and start controller 54, AM/FM receiver 56, and 911 assist controller 58, controller 40 will process the input information with respect to a routine 100 stored in memory 44 executed by control circuitry which in turn will adjust the electrical charging signal frequency and/or amplitude to be generated by the charger 26 in order to avoid potential inference with other vehicle modules.

Figure 7A:
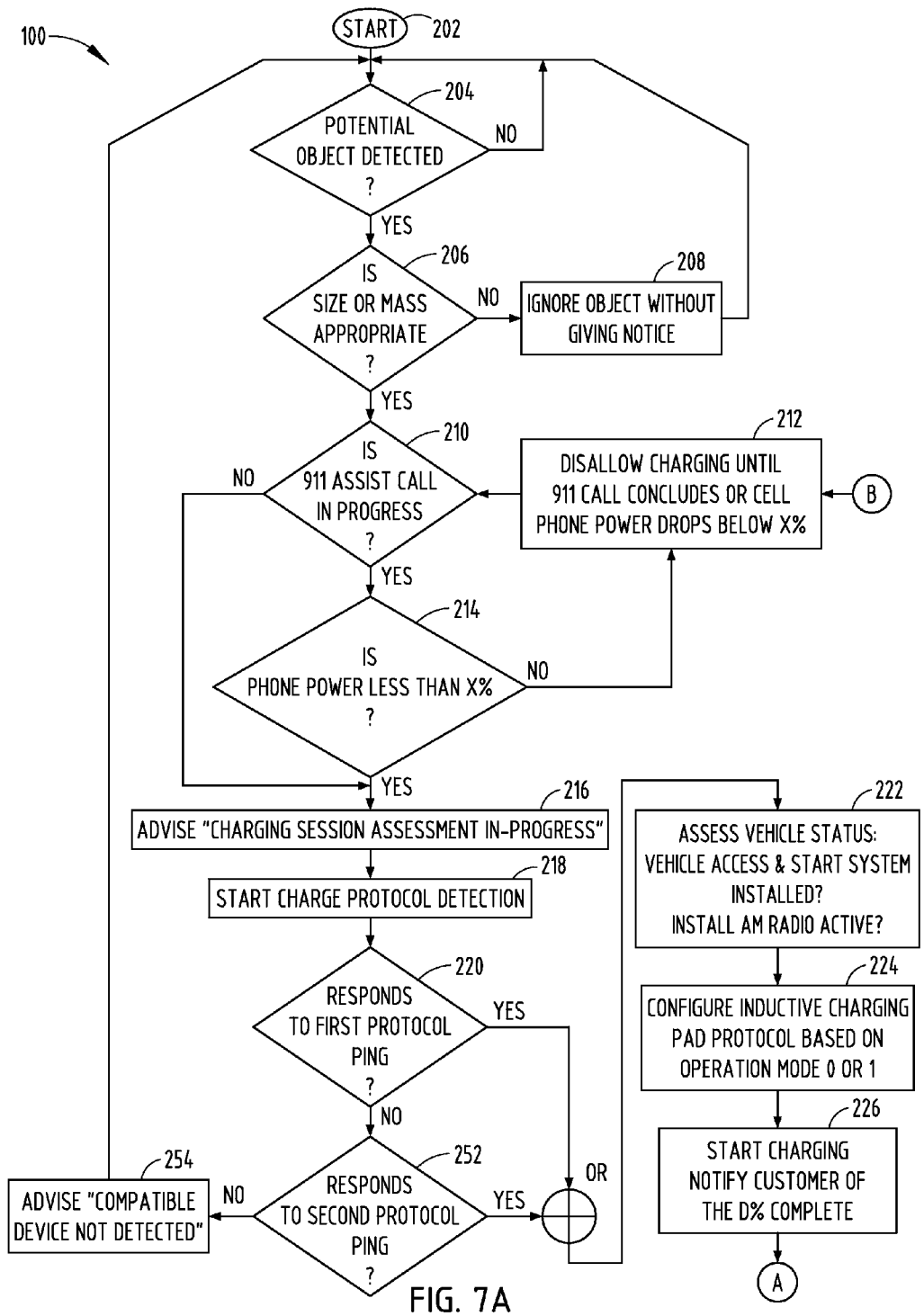
FIGS. 7A and 7B are a flow diagram illustrating the frequency/power adjustments routine for reducing interference in an inductive charging system 1, according to one embodiment.
Figure 7B:
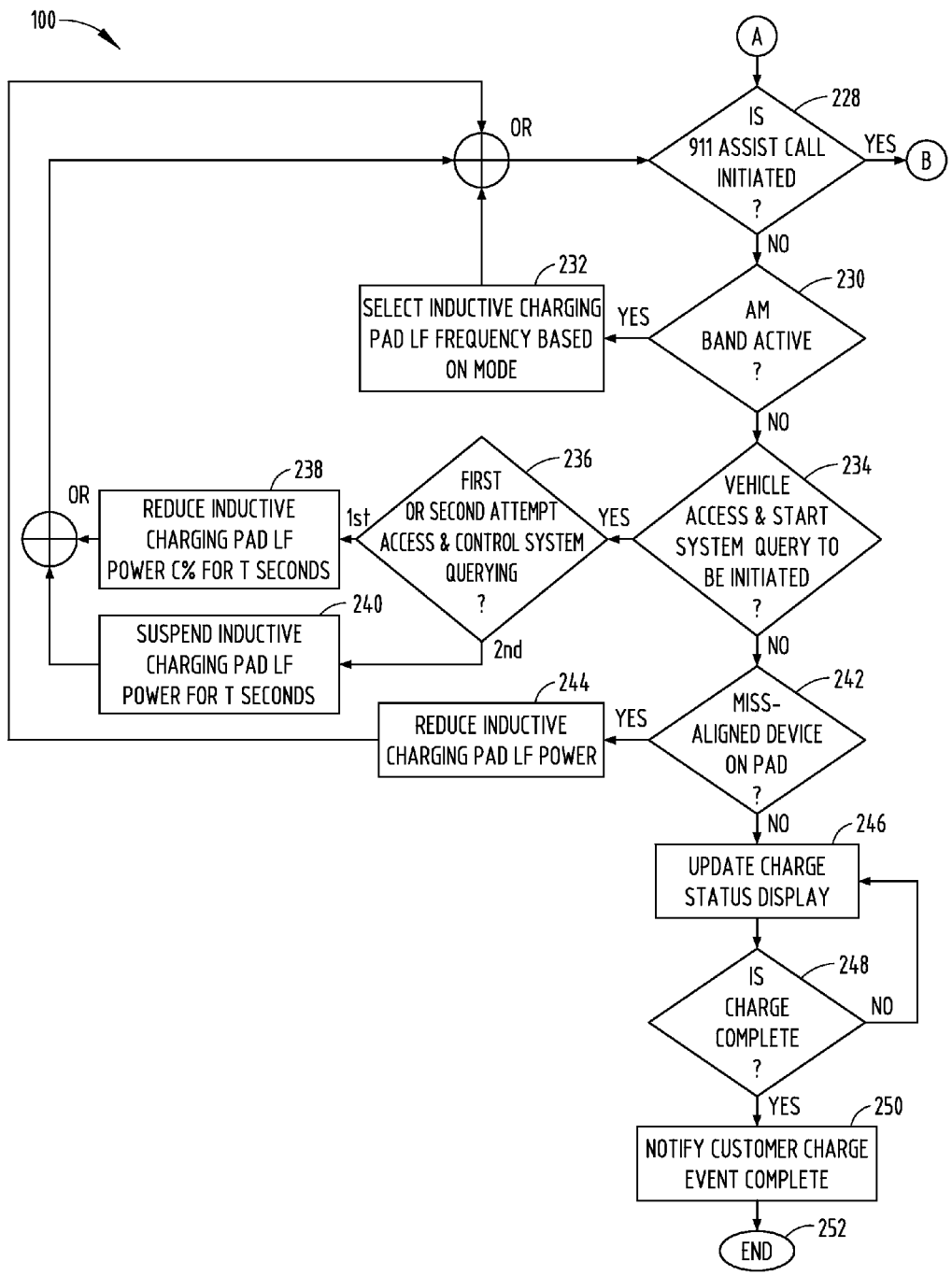

The table shown in FIG. 6 illustrates one embodiment of actions that may be affected by the frequency/power adjustment routine 100 of wireless charging system 30 depending on the type of inductive charging protocol device 25 responsible to the protocol and the mode of operation of vehicle modules detected by charging system 30. FIG. 7 shows a general flow chart illustrating the various steps of adjustment routine 100 that may be executed by controller 40 based upon the mapping shown in FIG. 6.

Referring to FIG. 7, routine 100 begins at step 202 and may determine if the wireless charger is on and proceeds to step 204 if wireless charger is on. In step 204, controller 40 determines whether a potential object has been detected on the surface of the charging system 30 and if the object detected is capable of being charged inductively by system 30. If in step 204, controller 40 determines these conditions have been met, controller 40 advances to step 206. Otherwise, controller 40 returns to step 204 to determine whether a new target object has been detected on the surface of system 30 and whether the object detected can be charged inductively.

In step 206, controller 40 determines if the object meets certain thresholds for size and/or mass. In this step, the controller 40 determines if the size and/or mass of the object detected is within a threshold criteria where it is expected that the object may be a device expecting to be charged by the charging system 30. If the object does not fall within the threshold criteria, controller 40 advances to step 208 in which it ignores the object without giving notice to the user and returns to step 204 to determine whether a new target object has been detected on the surface of charging system 30 and whether the object detected can be charged inductively. If the object does meet the threshold criteria of step 206, controller 40 advances to step 210. By not generating any energy until a potential receiver of a chargeable device has been detected, the system reduces the occurrence of potential broadcast radio frequency noise and mitigates the risk of interference from non-chargeable devices being left on the charging system 30.

In step 210, controller 40 determines whether a synchronized 911 Assist Call is in progress. Controller 40 advances to step 216 if synchronized 911 assist is not in progress. If the Assist Call is in progress, controller 40 then proceeds to 214 to decide whether a) the power remaining in the portable device such as cellular device 25 falls below a predetermined X % or b) if the power level of the cellular device 25 cannot be read. If neither of these conditions are met, controller 40 proceeds to step 212 in which charging becomes suspended unless the State of Charge (SOC) of the phone falls below X % and then proceeds back to step 210 in order to keep cellular device 25 charging and active while the 911 assist call is in progress. As also noted in Vehicle Operation Mode 10 of FIG. 6, charging is suspended irrelevant of system 30 wireless charging protocol usage. Steps 210, 212 and 214 assist in reducing the probability of frequency interference between the 911 Assist Call and the operating frequency of charging system 30 during charging. Additionally, steps 212 and 214 account for situations where suspension of charge should not be activated despite the potential for frequency interference from actively charging device 25 while 911 Assist is in progress or to be initiated. These type of situations occur when the SOC falls below a predetermined X %, such as 40%, where it would be imprudent to suspend charging below the predetermined X % level. Suspending charging below such a predetermined X % level may not give the wireless module 25 sufficient power to fully complete the 911 Assist operation or to allow for additional calls using the 911 Assist Call if the initial 911 Assist Call fails. If, in step 306, controller 40 determines that the wireless technology standard reading can be obtained and power is not less than X %, controller 40 advances to step 216.

In step 216, controller 40 outputs a visual indication to the user that the "Charging Session Assessment" is in-progress. The visual indication may be disposed upon charging region 24 and/or elsewhere in charging system 30 or the vehicle. Controller 40 next advances to step 218 to initiate determination of the type of inductive charging protocol that device 25 may respond to and with which the charging system 30 may be equipped. Each inductive charging protocol operates to generate charging power at a predetermined frequency band. For example, Qi Wireless Power Consortium (WPC) and Powermat Generation 2 may operate on a low frequency band of 90 kHz-205 kHz, whereas Powermat and Powermat Generation 1 which may operate on a low frequency band of 270 kHz-370 kHz.

Controller 40 next determines in step 220 whether chargeable device 25 responds to a first protocol ping. In this step, the transmitter circuit 110 of charging system 30 will attempt to communicate with the receiver 130 of rechargeable device 25 by sending a digital ping (a short periodic test pulse) to the receiver 130. After transmission of the digital ping, if the receiver 130 sends an appropriate feedback signal back to transmitter 110, this indicates the receiver is a valid, first protocol compliant system and controller 40 will proceed to step 222. If the device does not respond to a first protocol ping, controller 40 proceeds to step 252 to determine if the device responds to a second protocol ping. For example, in step 220, controller 40 may attempt to communicate with device 25 via a Qi standard complaint ping. If chargeable device 25 is non-responsive to the Qi complaint ping, controller 40 may then attempt to communicate with device 25 via a Powermat complaint ping. If the chargeable device does not respond to either a first protocol ping or a second protocol ping, controller 40 may indicate to the user that a "compatible device was not detected" in step 254 and proceeds back to step 204 to detect whether another potential object is on or in proximity to charging system 30. In other embodiments, there may be additional steps after step 252 testing if chargeable device 25 responds to additional protocol pings.

In another embodiment, charging system 30 may visually indicate to the user that the system is first protocol or second protocol compliant. For example, following satisfaction of step 220 or 252, charging system 30 may output a visual indication upon charging region 24 and/or charging system 30 to a user that the chargeable device is "Qi Complaint" or "Powermat Complaint." Such a visual indication may take the form of a logo or trademark representing the inductive charging protocol that chargeable device 25 was found complaint with.

If chargeable device 25 responds to either the first protocol ping or the second protocol ping, controller 40 then proceeds to step 222 to detect if a plurality of other electronic devices within vehicle 10 are installed including, a vehicle access and start system and/or a vehicle radio AM/FM band. Controller 40 next, in step 224, configures charging system 30 based upon operation modes labeled 0 or 1 if the vehicle access and start system or vehicle radio AM/FM band is detected as uninstalled or inactive. Otherwise, controller 40 proceeds to step 228. Such detection in step 222 may be a message from a separate module in the vehicle communicating to the controller 40 of charging system 30 the uninstalled or inactive state of vehicle access and start system and vehicle radio. In another embodiment, it may be assumed that if the controller 40 does not receive any messages from vehicle modules to operate in a different mode within a predetermined time, then controller 40 will communicate to charging system 30 to charge portable device 25 based upon operation modes 0 or 1.

Details of an example of operation modes 0 or 1 are described below with respect to FIG. 6. As shown in FIG. 6, if the vehicle operation mode communicated to controller 40 via vehicle bus 25 indicates no factory equipped vehicle access and start system (mode 1) or the vehicle is off, AM/FM band is off, or no vehicle access and start system is activated (mode 2), then controller 40 will instruct inductive charger 26 to charge portable device 25 on full LF band depending on the type of protocol with which the system 30 is operating. For example if system 30 operates on a Qi Wireless Power Consortium (WPC) protocol, charging system 30 would be instructed to charge portable device 25 at a low frequency band of 90 kHz-205 kHz during operation modes 0 or 1. The operating frequency does not need to be adjusted during detection of operation modes 0 or 1 because mitigation of frequency band interference between vehicle modules and charging system 30 will not be an issue if the vehicle modules are uninstalled or inactive.

Following configuring inductive charging system 30 based on operation mode 0 or 1, controller 40 proceeds to step 226 to charge portable device 25 at full LF band and to provide visual notification to the user of the percent charge completed of chargeable device 25. The visual indication may be disposed upon charging region 24 and/or elsewhere in the charging system 30 or the vehicle. Controller 40 next advances to step 228 to determine whether the 911 assist call has been initiated. If the 911 Hands-Free Cellular Assist feature has been initiated, then controller 40 loops back to step 212 in which charging becomes suspended unless the State of Charge (SOC) of the phone falls below X %. Controller 40 then proceeds to step 210 in order to keep suspension of charge active while the 911 Assist Call is in progress. As noted above, while suspending charging lowers the potential for frequency interference between charging device 25 and the in-progress or to be initiated 911 Assist, suspension of charging should not be activated when device 25 may not have sufficient power to fully complete the 911 Assist operations.

If, in step 228, controller 40 determines 911 Assist Call has not been initiated, controller 40 advances to step 230 to determine if the AM radio is activated at tuner frequencies greater than or equal to a predetermined P kHz. For example, P may be a threshold frequency of 825 kHz. With reference to FIG. 6, if the AM radio is activated, it may send a message to controller 40 communicating that a particular band is active at a particular frequency range either greater than or equal to a predetermined P kHz or less than a predetermined P kHz.

Alternatively, the operating frequency of the AM receiver 56 may be measured by a vehicle access and start controller 54 and the vehicle access and start controller 54 may broadcast a message over vehicle bus 50 to charging system 30 indicating the AM radio is operating at a frequency that is interfering with the operating frequency of inductive charger 30. If the AM band is detected as active by controller 40, controller 40 proceeds to step 232 and adjusts the operating frequency of charging system 30 depending on vehicle operating modes labeled 2 and 3 and the type of inductive protocol determined in steps 220 and 252. As shown in one embodiment in FIG. 6, for example, if AM radio is operating at a tuner frequency less than P kHz, this information is reported to controller 40, and if it is determined that device 25 responds to a second protocol, controller 40 will provide instructions to shift down the operating frequency by a factor of four (column 2, row 3) when delivering power to charging coil 27 of charger 26. Controller 40 then advances back to step 228 to determine if 911 Assist Call has been initiated and continues to loop between steps 228, 230, and 232 as long as the AM band is detected as active. In addition, if charging system 30 receives a broadcast message from bus 50 indicating the radio is in non-AM mode such as MP3 mode or FM mode, then charging system 30 would charge at full LF band without restriction and controller 40 would proceed to step 234.

As noted above, if AM band is inactive at particular tuner frequencies, controller 40 proceeds to step 234 to determine if a vehicle access and start system query has been initiated. The vehicle access and start system may provide a plurality of automated functions within vehicle 10 depending on user input including, but not limited to, allowing drivers to unlock a vehicle by touching a door handle and/or to start the vehicle. The vehicle access and start system may include signal receivers and antennas for processing user input and granting user access. The vehicle access and start system may be controlled by a separate module such as vehicle access and start controller 54 located within vehicle 10. Interactions between vehicle access and start controller 54 and a driver held key fob may occur at a frequency band that may conflict with the operating frequency of charging system 30. For example, the vehicle access and start system may communicate with the key fob at a frequency of 125 kHz (Amplitude Shift Key data pulses) and the fob may communicate with the vehicle access and start system at 315 MHz or 901 MHz. If the fob is placed too close to system 30, the key fob may sense a vehicle 125 kHz signal due to the 125 kHz energy emitted from system 30 during charging. In addition, the vehicle access and start system may not begin communication with the key fob unless a particular START, ENTRY or STATUS CHECK condition has been sensed by the system such as the activation of a door handle switch, pushing of a start button, releasing of a brake, or opening of a door.

In step 234, when the vehicle access and start system has been initiated, vehicle access and start controller 54 may broadcast a message over bus 50 to controller 40 indicating the vehicle access and start system initiation, and controller 40 will proceed to step 236. As shown in FIG. 6, if, in step 236, controller 40 receives a message indicating the vehicle access and start controller is attempting, for a first time, to communicate with a user held key fob, controller 40 may hold the LF band setting, but reduce the amount of power used to charge portable device 25 for a predetermined amount of time. Such a power reduction may occur while system 30 is operating in a first inductive protocol or a second inductive protocol, but operating in a third inductive protocol may allow system 30 to charge device 25 without restriction, as shown in FIG. 6. If, in step 236, controller 40 receives a message indicating the vehicle access and start controller is attempting, for a second time, to communicate with a driver held key fob, controller 40 may hold the LF band setting, but suspend charging of the device completely for a predetermined amount of time (vehicle operation mode 8 in FIG. 6).

In another embodiment, if controller 40 receives a message indicating the vehicle access and start controller is attempting, for a first time, to communicate with a user held key fob, controller 40 may exclude a particular frequency band from charging device 25 (vehicle operation mode 4 in FIG. 6). For example, if the key fob communicates to the vehicle controller 54 at 125 kHz, then the vehicle controller 54 will broadcast an indication of this fact via a data packet to controller 40 of inductive charging system 30. Controller 40 may then operate to delete the frequency band around 125 kHz (115-135 kHz band), thereby allowing charging system 30 to operate on a non-impeded frequency band. Following reduction or suspension of inductive charging power (steps 238 or 240) or adjustment of the frequency of charging system 30 depending on vehicle operating modes 2 and 3 (step 232), controller 40 loops back to step 228 to determine if 911 Assist Call has been initiated and continues to loop between steps 228, 230, and 232 as long as the AM band is detected as active.

In another embodiment, an operation for excluding a particular frequency band may depend on the location of the key fob relative to the vehicle access and start system (vehicle operation mode 5, FIG. 6). For example, after vehicle access and start system has been initiated in step 234, it may triangulate the positional coordinates of the key fob to determine if the key fob is a predetermined distance away from device 25 that is being charged by system 30. If the key fob is determined to not be within a distance from device 25 such that there lacks the risk of interfering with the operation of vehicle access and start system, then charging system 30 can continue to operate on its full LF band. If the key fob is determined to be within a distance from device 25 such that there would be a risk of interfering with the operation of vehicle access and start system, then controller 40 may continue to exclude the particular frequency band from charging device 25 (vehicle operation 5, FIG. 6).

Either reducing/suspending the amount of power charging of device 25 or removing the particular frequency band that system 30 is operating in will facilitate in reducing the risk that the communicating frequency between the key fob and vehicle controller will be obstructed by the noise caused from inductively charging device 25. However, removing the band or decreasing the power may also reduce the efficiency of the inductive charging of device 25. Therefore, if, in step 234, a vehicle access and start system query has not been detected as initiated, the frequency band will not be removed, and controller 40 will proceed to step 242.

Controller 40 next determines in step 242 whether chargeable device 25 has been misaligned on charging system 30. Misalignment may be detected when device 25 slides out of place to a position that result in the transmitter and receiver coils being offset by up to as much as 12 mm without a charging session termination because of a lack of detected communication between transmitter and receiver. Misalignment may occur because the chargeable device 25 slides off an optimal charging position while the vehicle is in motion. Depending on the shape of the phone and the amount of offset, misalignment may result in higher EMF energy radiating from charging system 30 during charging because of less optimal blocking of such EMF energy from the phone receiver assembly (i.e. receiver coil and ferrite plate). Higher EMF energy radiating from system 30 may increase the potential for interference with other systems. Thus, when controller 40 detects device 25 is misaligned, controller 40 proceeds to step 244 to hold the LF band setting, but reduce the amount of power charged to device 25 by a predetermined percentage (operation mode 6, FIG. 6). Reducing the amount of charge will reduce the amount of EMF energy radiating from charging system 30. Controller 40 then loops back to step 228 to determine if 911 Assist Call has been initiated.

If controller 40 determines device 25 is not misaligned, then it proceeds to step 246 to visually indicate an update of the charging status to the user. Such visual indication may show a new percentage charge completed for device 25. Controller 40 then proceeds to step 248 to determine if the charging of device 25 has been completed. If not, then controller 40 loops back to step 246 to determine the charging status of the display. When charging of device 25 has been completed, controller 40 proceeds to step 250 to visually indicate to the user that the charging event has been completed and then proceeds to end process.

Accordingly, the wireless inductive charging system 30 advantageously reduces or prohibits emission of energy from radiating at certain charging frequencies or operating at certain power levels within a charging region. This advantageously prevents the electromagnetic field created by the charger during wireless charging from interfering with the operation of other devices or systems in its proximity. The wireless charging system 30 is particularly well suited for use on a vehicle where there are many electronic devices that may operate on a similar frequency band as the wireless system. However, the system may be useful for other applications. It should be appreciated that when the object is no longer detected as interfering with other devices, the wireless charging may be increased and resumed.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A method for reducing interference in an inductive charging system, the method comprising:
   determining whether a chargeable device communicates with at least one inductive charging protocol employed by an inductive charger;
   inductively charging the chargeable device with the inductive charger;
   detecting a mode of operation of a potential interfering device in proximity to the inductive charger; and
   adjusting at least one of a frequency band employed by the charger and an amount of power provided to the chargeable device by the charger based on the detected mode of operation and consideration of the at least one inductive charging protocol.

2. The method of claim 1 further comprising the step of detecting the presence of the chargeable device proximate to or on a surface of an inductively powered module.

3. The method of claim 1 further comprising the step of identifying at least one characteristic of an object on a surface of an inductively powered module.

4. The method of claim 1, wherein said mode of operation includes detecting a frequency of said potentially interfering device.

5. The method of claim 1, wherein the inductive charging system is in a vehicle.

6. The method of claim 5, wherein the system comprises a charging region provided in a tray within the vehicle.

7. The method of claim 1, wherein charging of the chargeable device is suspended for a predetermined time based upon said detected mode of operation.

8. A charging system for reducing interference during inductive charging of a portable device, comprising:
   an inductively powered charger; and
   a controller that detects a mode of operation of a potential interfering device in proximity to the charger, and adjusts at least one of a frequency band employed by the charger and an amount of power provided to the portable device by the charger based on an inductive charging protocol and the detected mode of operation.

9. The charging system of claim 8, wherein the controller detects presence of the portable device proximate to or on a surface of an inductively powered module.

10. The charging system of claim 8, wherein the controller identifies at least one characteristic of an object on a surface of an inductively powered module.

11. The charging system of claim 8, wherein said mode of operation includes detecting a frequency of said potentially interfering device.

12. The charging system of claim 8, wherein the controller further determines whether the portable device communicates with at least one inductive charging protocol employed by the inductively powered charger.

13. The charging system of claim 8, wherein the wireless charging system is in a vehicle.

14. The charging system of claim 8, wherein the system comprises a charging region provided in a tray within the vehicle.

15. The charging system of claim 8, wherein charging of the portable device by the charger is suspended for a predetermined time based upon said detected mode of operation.

16. An in-vehicle system for reducing interference during inductive charging of portable devices, comprising:
   a charger region provided in a vehicle;
   an inductively powered charger;
   a controller in communication with the inductive charger; and
   wherein the controller detects a mode of operation of a potential interfering device in proximity to the charger and adjusts at least one of a frequency band employed by the charger and an amount of power provided to the portable device by the charger based on a type of inductive charging protocol used by the portable device and the detected mode of operation.

17. The charging system of claim 16, wherein the charger region is provided in a tray within the vehicle.

* * * * *